D-C STABILIZED AMPLIFIERS

Filed Oct. 19, 1955 2 Sheets-Sheet 1

INVENTOR.
Charles B. Oakley
BY
[signature]
ATTORNEY

D-C STABILIZED AMPLIFIERS

Filed Oct. 19, 1955 2 Sheets-Sheet 2

INVENTOR.
Charles B. Oakley
BY
[signature]
ATTORNEY 2,901,534

D-C STABILIZED AMPLIFIERS

Charles B. Oakley, Hamilton Square, N.J., assignor to Radio Corporation of America, a corporation of Delaware Application October 19, 1955, Serial No. 541,499

16 Claims. (Cl. 178—5.4)

The present invention relates to circuits for stabilizing the D.-C. operating point of the electron tubes in amplifiers and more particularly in chroma amplifiers and demodulators of color information in a color television receiver.

The drift of the direct current operating point in electron tube devices may be attributed to variations in the equivalent impedance and in the contact potential associated with the cathode and the first control electrode of the electron tube device.

The cathode of an electron tube device such as an amplifier tube, may be represented by an impedance between the emitting surface of the cathodes and the cathode lead; see Nergaard, "Studies of an Oxide Coated Cathode," RCA Review, December 1952. This impedance is the result of the electrical conduction characteristics of the cathode oxide and the base metal of the cathode structure. A voltage constituting a contact potential is developed between the cathode and the current controlling element. Cathode aging and variation in cathode temperature cause variation in the value of the impedance between the emitting surface of the cathode and the cathode lead. Variation in the resistive component of the internal impedance of the cathode also produces a variation in the potential between the emitting surface of the cathode and the current controlling electrode such as the first control grid. Additional changes in the effective potential between the emitting surface of the cathode and the control grid are produced by variation of the contact potential which is a function of cathode temperature.

In many types of communication circuits it is important that amplifiers be controlled so that the tube aging or the replacement of tubes, or the changing of cathode temperature does not change the D.-C. operating point and the transfer characteristics of the amplifier tube. This is particularly true in computer circuits where signals representing computor information must be transferred with considerable accuracy from one portion of a computor circuit to another.

Drift in the D.-C. operating point of amplifier tubes must be prevented in the color difference signal amplifier of color television receivers where a plurality of demodulated color difference signals are utilized to drive a color image reproducer. Should the amplitude of one or more of the color difference signals applied to the color image reproducer change because of the aforementioned drift in D.-C. operating point of an associated amplifier tube considerable deterioration in the color balance and color content of the reproduced color image will be experienced.

It is an object of this invention to produce an amplifier which is stabilized against drift in D.-C. operating point.

It is another object of this invention to D.-C. stabilize color difference signal circuits of a color television receiver.

It is a further object of this invention to prevent the deterioration of a reproduced color image as a result of tube aging.

According to the invention the D.-C. operating point of an electron tube is stabilized against changes due to cathode aging and variations in cathode temperature by intermittently clamping the potential of the control grid at a fixed potential with respect to the effective potential of the emitting surface of the cathode instead of biasing the control grid with respect to the cathode lead.

Other and incidental objects of this invention will become apparent upon a reading of the specification and a study of the drawings, where:

Figure 1A is a schematic diagram of one form of the present invention.

Figure 1B lists equations which relate to the circuit of Figure 1A.

Figures 1A, 1B, 2:
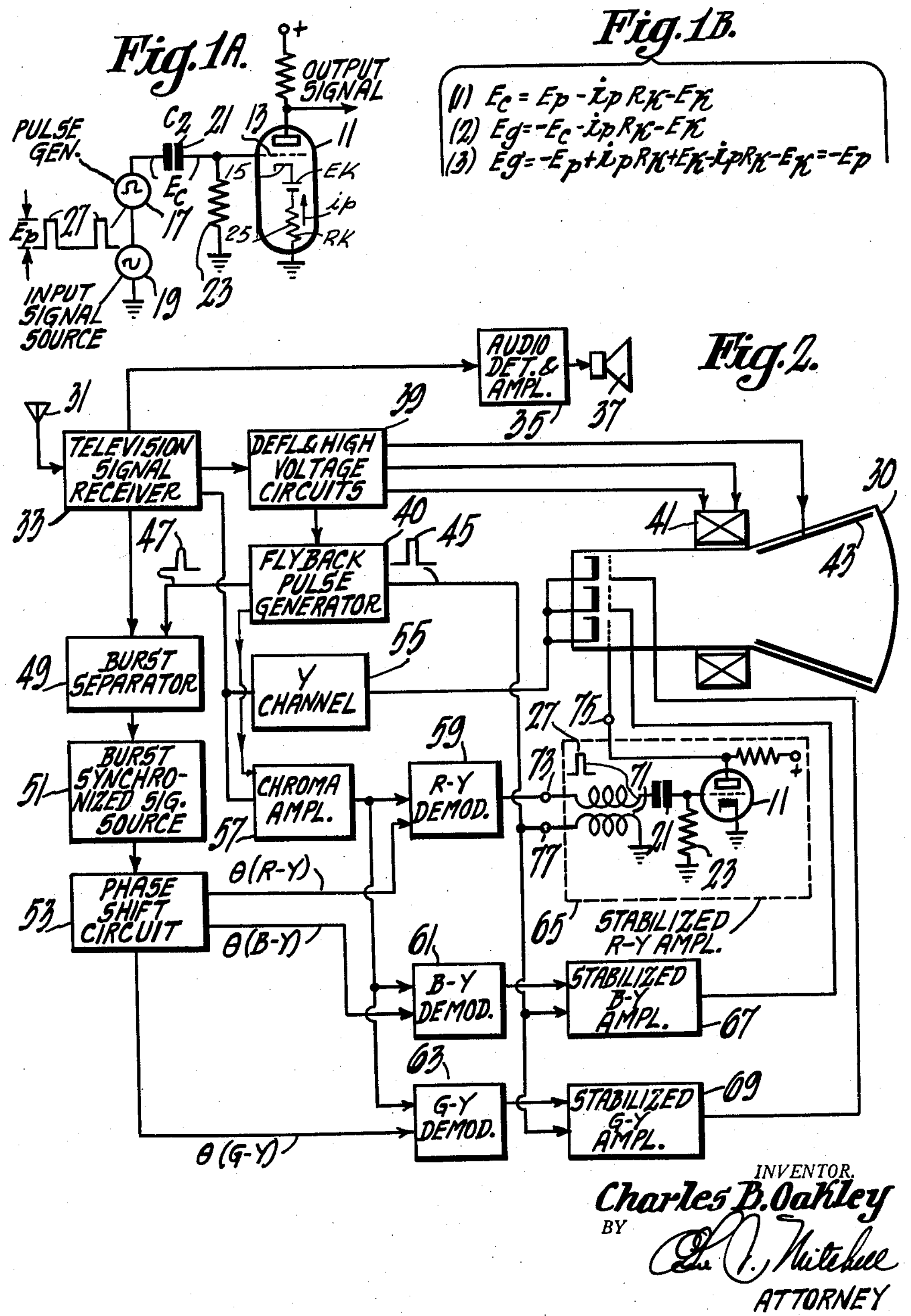
Figure 2 is a block diagram of a color television receiver including a schematic diagram of a stabilized color difference signal amplifier.

The circuit of Figure 1A is one form of the present invention wherein the operating condition of the tube 11 is stabilized against D.-C. drift by clamping the voltage at the control grid 13 at a fixed potential with respect to the effective potential of the emitting surface of the cathode instead of biasing the control grid with respect to the external cathode lead. This clamping action is accomplished in the following manner. A pulser or pulse generator 17 is coupled with the input signal source 19 to the control grid 13 by way of the condenser $C_2$ bearing the numeral 21. A resistance 23 is coupled between the control grid 13 and ground; a resistance $R_k$ bearing the numeral 25 is coupled between the cathode 15 and ground. The cathode potential is equivalently represented by a series potential source $E_k$ between the cathode 15 and the resistor 25.

Battery $E_k$ represents the effective potential between the grid and cathode, caused by the initial emission velocity of the electrons leaving the cathode and the sum of the contact potentials around the grid to cathode electrical circuit. Resistor $R_k$ represents the total D.-C. resistance between the cathode pin of the tube and the emitting surface of the cathode. Physically, this resistor represents two components; first, a resistive layer which develops in the interface between the base metal of the cathode and the oxide coating, and second, a resistance within the oxide coating itself. Plate current flowing through the internal cathode resistance produces a voltage drop which adds to the contact potential and external grid bias. The development of this internal cathode resistance causes the apparent "lack of emission" and loss in measured transconductance in a "weak" tube.

Normal tube aging and variations in cathode temperature both cause variations in the effective values of contact potential and internal cathode resistance. In new tubes operated at normal heater voltage, the resistance is normally small, of the order of five ohms or less. Hence, the increase in plate current with above-normal heater voltage is primarily due to changing contact potential. At reduced heater voltage, the effects of both contact potential and internal cathode resistance act to reduce the plate current.

Cathode behavior is greatly influenced by obscure variations in the manufacturing process. The value of the cathode resistance will increase with time after an initial period, and will ultimately render the tube useless. To mention a few examples, a 6U8 taken from a sync generator after 1800 hours of service measured "weak" on a *gm* meter and had developed 1100 ohms of cathode resistance. A 12BH7, after 800 hours of operation on a life test, showed 342 ohms of cathode resistance; while another, taken from the same lot of the same manufacturer, showed only 25 ohms. Both tubes had substantially no cathode impedance at the beginning of the test. After 800 hours of life test, one section of a dual triode showed 255 ohms of resistance in the cathode and the other 157 ohms. If these two triode sections had been used as color difference amplifiers supplying two grids of a tricolor kinescope, the resulting shift in kinescope white balance would have been intolerable.

Returning to the circuit of Figure 1A, which is one form of the present invention, let the pulse generator 17 produce pulses $E_p$ bearing the numeral 27 and let the total cathode current, excepting the current which flows to the control grid 13, be represented as $i_p$. During a positive pulse period of the pulses 27, the condenser 21 will be charged to a potential $E_c$ according to Equation 1 which is listed in Figure 1B. The condenser 21 will retain this potential when the pulse is removed so that the control grid 13 will be at the potential $-E_c$ with respect to ground. The net voltage $E_g$ between the cathode emitting surface and the control grid 13 will thus be expressable by Equation 2 of Figure 1B. Substituting $E_c$ of Equation 1 into Equation 2 of Figure 1B, it follows from Equation 3 of that figure that $E_g$ is equal to $-E_p$. It therefore follows that the effective bias on the tube 11 is dependent only upon the amplitude of the pulses 27 and is independent of the variation in cathode impedance and contact potential. It is to be appreciated therefore that the D.-C. current of tube 11 will be dependent upon $E_g$ and not on those parameters of tube 11 which will change due to tube aging, cathode aging, variations in cathode temperature or the changing of the tubes or the replacement of the tube with another tube.

Figure 2 is a block diagram of a color television receiver which utilizes the present invention for stabilizing the amplifiers which amplify and apply the color difference signals to the color kinescope 30.

The present invention is ideally suited for use in a color television or monochrome television receiver since no picture information is transmitted during the horizontal retrace interval and the stabilizing pulses may be produced and used according to the invention during this interval.

Consider first the overall operation of the color television receiver diagrammed in Figure 2. The incoming signal from the broadcast transmitter is received at the antenna 31 and applied to the television signal receiver 33. The television signal receiver demodulates a composite color television signal which includes a luminance signal, a chrominance signal, deflection and color synchronizing signals and a sound modulated carrier which is transmitted 4½ mcs. removed from the picture carrier. The luminance signal contains wide band picture information representative of the monochrome version of the televised image. The chrominance signal includes modulations representative of color difference signals each of which, when demodulated and combined with the luminance signal, products a component color signal. The color difference signals may be demodulated from the chrominance signal by synchronous demodulation. Each color difference signal in the chrominance signal has a phase related to the phase of the color synchronizing signal which is transmitted in the form of a burst on the "back porch" of each horizontal synchronizing pulse.

The sound information is demodulated from the color television signal utilizing, for example, an intercarrier sound circuit, in the audio detector and amplifier 35. The amplified sound signal is applied to the loud speaker 37.

The demodulated color television signal is applied to the deflection and high voltage circuits which apply deflection signals to the deflection yokes 41 and a high voltage to the ultor 43 of the color kinescope 30. The deflection and high voltage circuits 39 also energize the flyback pulse generator which produces a flyback pulse 45 during each retrace interval in addition to a pulse 47 which has a duration interval at least that of the color synchronizing bursts.

The color television signal is applied to the burst separator 49 to which the pulses 47 are also applied. The bursts are separated from the color television signal therein and applied to the burst synchronized signal source 51 which develops a continuous signal which has the frequency of the burst and a phase prescribed by the bursts. The output of the burst synchronized signal source 51 is used to drive the phase shift circuit 53 which produces a plurality of demodulating signals having phases corresponding to the color difference signals which are to be demodulated from the chrominance signal. In the circuit of Figure 2 a trio of demodulating signals are produced having phases corresponding to red, blue and green color difference signals, namely, R–Y, B–Y and G–Y color difference signals.

The color television signal is applied simultaneously to the Y channel 55 and the chroma amplifier 57. The Y channel amplifies and delays the wide band color television signal which may be used as the luminance signal and applies the luminance signal to the cathodes of the color kinescope 30.

The chroma amplifier 57 filters out the deflection synchronizing signals and the lower frequency components of luminance signal and amplifies the chrominance signal portion of the color television signal within desired frequency limits. The output of the chroma amplifier is applied simultaneously to the R–Y demodulator 59, the B–Y demodulator 61 and the G–Y demodulator 63. R–Y, B–Y and G–Y phased demodulating signals are applied respectively to the R–Y demodulator 59, the B–Y demodulator 61 and the G–Y demodulator 63. Each of these demodulators produces the corresponding color difference signal related to the phase of the applied demodulating signal.

The circuit of Figure 2 shows a trio of demodulators being used. In another form of color television receiver a third color difference signal may be formed by properly matrixing prescribed amplitudes and polarities of a pair of demodulated color difference signals.

The R–Y color difference signal is applied through the stabilized R–Y amplifier 65 to a control electrode of the color kinescope 30. In like fashion, the B–Y and G–Y color difference signals are applied through the stabilized B–Y amplifier 67 and the stabilized G–Y amplifier 69, respectively, to corresponding control electrodes of the color kinescope 30. Stabilized amplifiers for each of the three color difference signals prevent variations in the levels of the color difference signals at the color kinescope due to cathode aging and other reasons previously mentioned in the specification. It will be appreciated that without proper stabilization of the color difference signal amplifiers, the drift of the D.-C. operating point of one or more of these amplifiers will result in color unbalance and also shifts in "grey-scale" hue.

The stabilized R–Y amplifier 65 is diagrammed in schematic form in Figure 2 to illustrate one form of the invention. The operation of the stabilized R–Y amplifier 65 closely follows the principles described in connection with Figure 1A. The secondary winding of a flyback pulse transformer 71, is connected in series between the terminal 73, at which the R–Y color difference signal is applied, and the condenser 21. The condenser 21, the resistor 23 and the tube 11 bear the same numerals as employed in the circuit of Figure 1A since these parameters function in the manner previously described. The color difference signal developed at the output of the tube 11 is thereupon applied to a suitable control electrode of the color kinescope 30 by way of terminal 75. The kickback pulse 45 from the kickback pulse generator 40 is applied to the primary of the transformer 71 by way of the terminal 77; the kickback pulse 45 develops the grid bias across the condenser 21 responsive to the control grid of tube 11 drawing current during each kickback pulse 45. The average voltage level at which the R–Y color difference signal is applied to the control electrode of the color kinescope 30 will depend on the grid bias.

A further appreciation of the present invention is to be had by an understanding of the fact that the present invention reinserts a pulse in the chrominance signal during the scanning retrace interval. This inserted pulse is thereupon used for D.-C. stabilization or D.-C. restoration according to the present invention. Demodulated bursts are prevented from appearing at the outputs of the demodulators 59, 61, 63 and adversely affecting the D.-C. restoration in the respective amplifiers 65, 67, 69, by gating or disabling the chroma amplifier 57 or the demodulators during the retrace interval, in accordance with the teachings of application Serial No. 361,978 on "Color Television Signal Receiving Apparatus," filed by Robert D. Flood and Loren R. Kirkwood on June 16, 1953.

Figure 3:
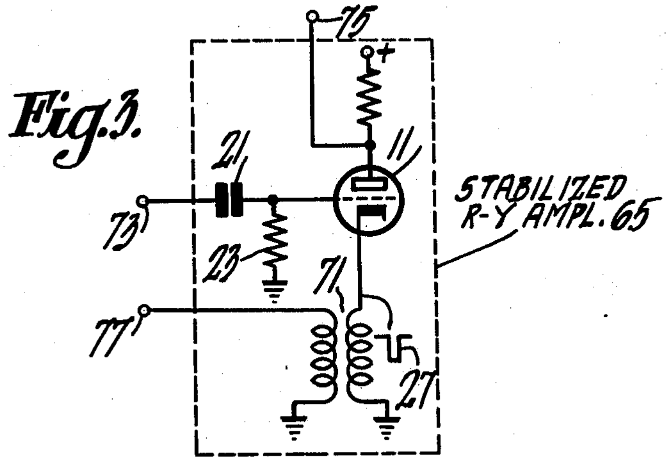
Figure 3 is a schematic diagram of another form of the color difference signal amplifier of the circuit of Figure 2.

The stabilized R–Y amplifier 65 of Figure 3 illustrates another mode of connection which stabilizes the R–Y amplifier according to the present invention. In this circuit, the transformer 71 is connected so that its secondary is coupled serially between the cathode of tube 11 and ground. This circuit also produces a bias voltage across condenser 21 which provides a stable bias on the control grid of tube 11 which is independent of tube aging, the circuit of Figure 3 has the advantage of isolating the secondary of the transformer from the demodulator circuit.

The preceding discussion has involved the use of the present invention for stabilizing a color difference signal amplifier; it is to be appreciated that the present invention may also be utilized for stabilizing certain types of color demodulators. One form of demodulator utilizing the present invention is included in the color television receiver circuit shown in Figure 4. Where the circuits of the color television receiver of Figure 4 correspond to those of the color television receiver of Figure 2, identical numerals are utilized.

Figure 4:
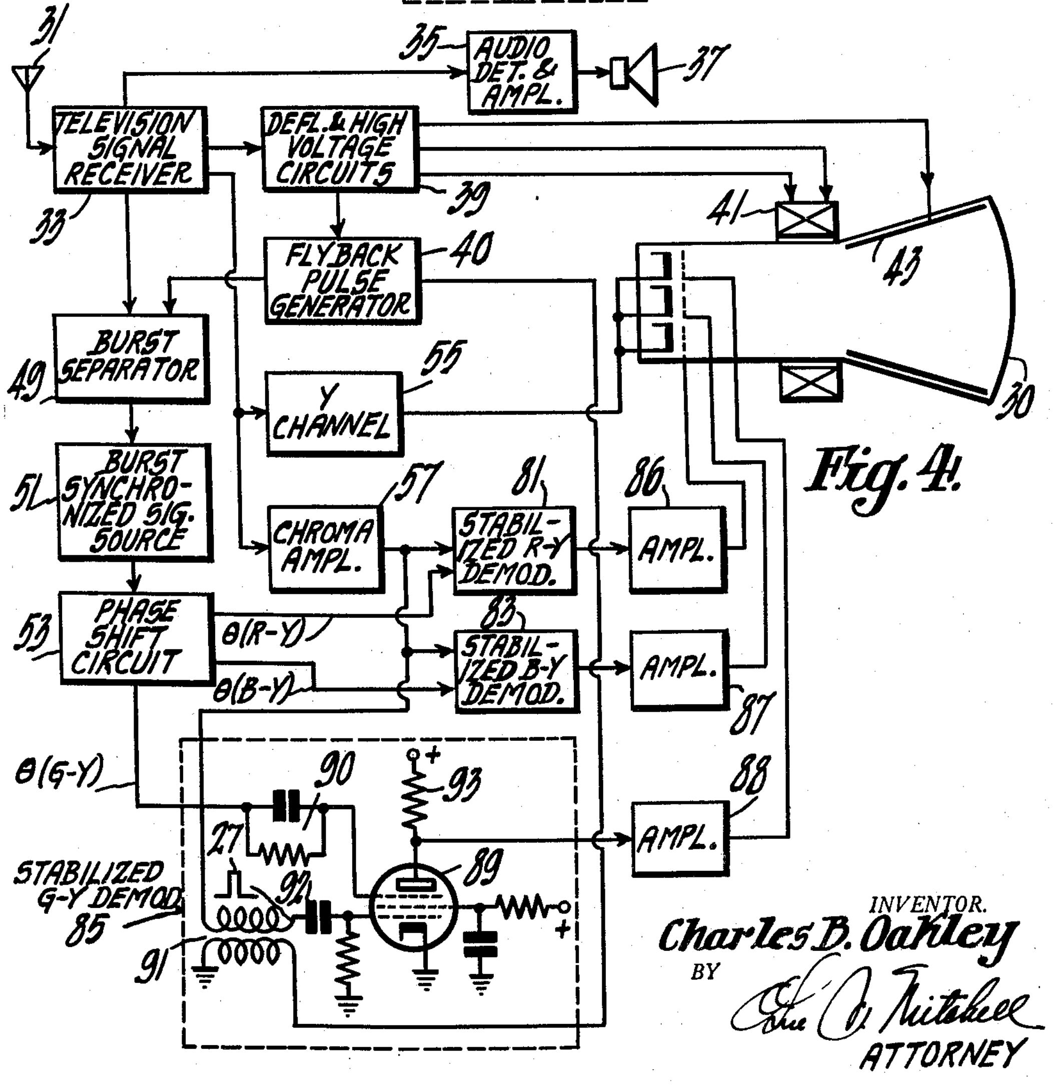
Figure 4 is a block diagram of a color television receiver and includes a schematic diagram of a D.-C. stabilized demodulator circuit.

The color television receiver of Figure 4 utilizes a stabilized R–Y demodulator 81, a stabilized B–Y demodulator and a stabilized G–Y demodulator 85. The demodulated R–Y, B–Y and G–Y color difference signals are thereupon passed through the amplifiers 86, 87 and 88, respectively, and then applied to corresponding control electrodes of the color kinescope 30. It is to be appreciated that the amplifiers 86, 87 and 88 may also be stabilized using the present invention.

The stabilized G–Y demodulator 85 uses the following typical connections. A multigrid tube 89 is used. A G–Y phased demodulating signal is applied to the third grid of the tube 89 by way of the biasing circuit 90. The chrominance signal from the chroma amplifier 57 is applied to the first grid of the tube 89 by way of the secondary of the transformer 91 and the condenser 92. An anode resistor 93 is coupled to the anode of tube 89 and is operatively connected to apply an output signal to the amplifier 88. Pulses applied from the flyback generator 40 to the primary of the transformer 91 will produce pulses between the first grid and cathode of tube 89 causing stabilization of this tube in the manner previously described in the specification. The biasing circuit 90 may be adjusted to provide class C operation of the third grid of tube 89 depending on the type of demodulator action desired of the stabilized G–Y demodulator 85. Interaction of the G–Y phased synchronous demodulating signal and the chrominance signal in the tube 89 will produce a demodulated R–Y color difference signal across the anode resistor 93; this demodulated G–Y color difference signal is applied therefrom to the amplifier 88.

Having described the invention, what is claimed is:

1. In a color television receiver adapted to receive a color television signal including a luminance signal, a chrominance signal, and horizontal deflection synchronizing pulses, said horizontal deflection synchronizing pulses occurring during scanning retrace intervals, the combination of, means to derive from said color television signal a color information signal wherein said horizontal deflection synchronizing pulses and selected frequency components of said luminance signal are suppressed, an electron flow device having a cathode and a control electrode to control electron flow, means for developing one pulse during each retrace interval, means to add said pulses to said color information signal to form a combined signal, and means to apply said combined signal to said control electrode for developing a bias voltage between said cathode and said control electrode therefrom.

2. In a color television receiver adapted to receive a color television signal including a luminance signal, a chrominance signal and horizontal deflection synchronizing pulses, said horizontal deflection synchronizing pulses occuring during the scanning retrace intervals, the combination of, means to suppress said horizontal deflection synchronizing pulses and selected lower frequency components of said luminance signal from said color television signal to form a chrominance signal, means for deriving a color difference signal from said chrominance signal, a chrominance channel amplifier device having a cathode and a control electrode, means to apply said chrominance signal to said control electrode and to cause said control electrode to draw current during each scanning retrace interval, and means responsive to current drawn by said control electrode to develop a bias voltage between said cathode and said control electrode.

3. In a color television receiver adapted to receive a color television signal including horizontal deflection synchronizing pulses occurring during the scanning retrace intervals, color synchronizing bursts, a luminance signal and a chrominance signal, the combination of, means to eliminate said horizontal deflection synchronizing pulses and a selected range of frequencies of said luminance signal from said color television signal to provide said chrominance signal, a chrominance channel amplifier device having a cathode and a control electrode, means for applying said chrominance signal to the control electrode of said amplifier device, means providing a pulse of uniform amplitude during each retrace interval, means to add said pulses to said chrominance signal, and means to derive a bias voltage between said cathode and said control electrode for said amplifier device from said pulses added to said chrominance signal.

4. A chrominance channel amplifier comprising the combination of, a terminal at which is provided a color information signal between retrace intervals of a color television signal, an electron flow amplifier having a control electrode and an electron flow source having an emitting surface and an output electrode, means coupled to said terminal to apply said color information signal to said control electrode, means to cause a pulse of current of uniform amplitude to intermittently flow during each retrace interval from said electron flow source to said control electrode, means included in said color information signal applying means and responsive to said pulses of current flowing to said control electrode from said electron flow source to produce a bias potential between said electron flow source and said control electrode which is dependent upon the magnitude of said pulse of current flowing to said control electrode.

5. In a television circuit, the combination of, an electron flow device having at least a control electrode and a source of electron flow, a circuit providing television signal intelligence occurring between retrace intervals of a television signal, flyback pulse transformer to provide an intermittent pulse of uniform amplitude during each retrace interval, means coupling said transformer and said intelligence providing circuit between said control electrode and said source of electron flow to cause the rectification of said pulses by said electron flow device and to therefrom develop from said rectification a potential between said source of electron flow and said control electrode related to the amplitude of said pulses.

6. In an electron tube circuit, the combination of, an electron tube having a cathode and a first control grid, a source of intermittent pulses of prescribed amplitude, a source of intermittent intelligence signals occurring during intervals other than the duration intervals of said pulses, means applying said pulses and said intelligence signals between said first control grid and cathode, and means connected between said cathode and control grid to develop a continuous voltage between said cathode and said control grid having an amplitude related to the amplitude of said pulses.

7. In a color television receiver adapted to receive a color television signal including a chrominance signal, the combination of, means to demodulate a first color difference signal occurring between retrace intervals from said chrominance signal, an electron tube device having at least a cathode and a first control grid, a source of intermittent flyback pulses occurring during retrace intervals and having a prescribed polarity of amplitude, condenser means to couple said intermittent pulses between said first control grid and said cathode to develop a voltage between said cathode and said first control grid responsive to the rectification of said intermittent pulses by said first control grid, and means including said condenser means to apply said color difference signal to said first control grid.

8. In a color television receiver adapted to receive a color television signal including a chrominance signal, the combination of, means to demodulate a first color difference signal from said chrominance signal, an electron tube device having at least a cathode and a first control grid, a source of intermittent flyback pulses having a prescribed amplitude, condenser means to apply said first color difference signal to said first control grid, and means to apply said pulses to said cathode to cause electron flow to said first control grid due to said pulses and to therefrom develop across said condenser a bias voltage related to the amplitude of said pulses.

9. In a color television receiver adapted to receive a color television signal including a chrominance signal and color synchronizing bursts, the combination of, means responsive to said color synchronizing bursts to develop a reference signal having a prescribed phase, a demodulating electron tube device having at least an output circuit and an electron flow control electrode and a cathode, means to impress both said chrominance signal and a selected phase of said demodulating signal into the electron flow of said demodulating device, pulser means coupled to at least said electron flow control electrode to cause rectification of said pulses at said electron flow control electrode, and means responsive to the rectification of said pulses at said electron flow control electrode to establish a bias of magnitude related to the amplitude of said pulses between said electron flow control electrode and said cathode to control said electron flow.

10. In a color television receiver adapted to receive a color television signal including a chrominance signal and color synchronizing bursts, the combination of, means responsive to said color synchronizing bursts to develop at least a reference signal having a prescribed phase, a demodulating electron tube device having at least an output circuit and an electron flow control electrode and a cathode, means to impress a selected phase of said demodulating signal into the electron flow of said demodulating device, pulser means to provide intermittent flyback pulses of prescribed amplitude, means to couple said pulses and said chrominance signal between said cathode and said electron flow control electrode said pulses having a polarity whereby rectification of said pulses occurs between said cathode and said electron flow electrode, and means responsive to the rectification of said pulses between said cathode and said electron flow control electrode to establish a bias potential between said cathode and said electron flow control electrode.

11. In a color television receiver adapted to receive a color television signal including a chrominance signal and color synchronizing bursts, the combination of, means responsive to said color synchronizing bursts to develop at least a reference signal having a prescribed phase, a demodulating electron tube device having at least a cathode, a first control electrode, a second control electrode and an output circuit coupled to an anode, means to apply a first prescribed phase of said reference signal to said second control electrode, means to filter said chrominance signal from said color television signal, pulser means, condenser means, and means to couple said pulser means and said condenser means serially between said chrominance signal filtering means and said first control electrode to cause rectification of said pulses between said first control electrode and said cathode and develop a bias voltage across said condenser means.

12. In a color television receiver adapted to receive a color television signal including a chrominance signal and color synchronizing bursts, the combination of, means responsive to said color synchronizing bursts to develop at least a reference signal having a prescribed phase, a demodulating electron tube device having at least a cathode, a first control electrode, a second control electrode and an output circuit coupled to an anode, means to apply a first prescribed phase of said demodulating signal to said second control electrode, means to filter said chrominance signal from said color television signal, pulser means, condenser means, and means to serially couple said pulser means and said chrominance signal filter means and said condenser means between said first control electrode and said cathode to cause the rectification of said pulses between said first control electrode to develop from said rectification a bias voltage between said cathode and said first control electrode.

13. In a color television receiver or the like, the combination of a color demodulator providing a color difference signal including color difference information during the trace interval which is interrupted during the retrace interval, a color difference signal amplifier including a vacuum tube having cathode and grid input electrodes and an output electrode, an alternating current coupling including a capacitor connecting the output of said demodulator to the input electrodes of said amplifier, a kinescope including an electron gun having input electrodes, a direct current coupling from the output electrode of said amplifier to the input electrodes of said kinescope, a source of pulses of constant amplitude occurring during said retrace interval, and means coupling the output of said source of pulses to the input electrodes of said amplifier in a polarity and with an amplitude such as to draw grid current and establish a bias voltage between the grid and the surface of the cathode which is substantially independent of cathode internal resistance and contact potential.

14. In a color television receiver or the like, the combination of a color demodulator providing a color difference signal including color difference information during the trace interval which is interrupted during the retrace interval, a color difference signal amplifier including a vacuum tube having cathode and grid input electrodes and an output electrode, an alternating current coupling including a capacitor connecting the output of said demodulator to the input electrodes of said amplifier, an image reproducing device having input electrodes, a direct current coupling from the output electrode of said amplifier to the input electrodes of said image reproducing device, a source of pulses of constant amplitude occurring during said retrace interval, and means coupling the output of said source of pulses to the input electrodes of said amplifier in a polarity and with an amplitude such as to draw grid current and establish a bias voltage between the grid and the surface of the cathode which is substantially independent of cathode internal resistance and contact potential.

15. In a color television receiver or the like, the combination of a source of a color difference signal including color difference information solely during the trace interval, a color difference signal amplifier including a vacuum tube having cathode and grid input electrodes and an output electrode, an alternating current coupling including a capacitor connecting the output of said source to the input electrodes of said amplifier, a kinescope including an electron gun having input electrodes, a direct current coupling from the output electrode of said amplifier to the input electrodes of said kinescope, a source of pulses of constant amplitude occurring during said retrace interval, and means coupling the output of said source of pulses to the input electrodes of said amplifier in a polarity and with an amplitude such as to draw grid current and establish a bias voltage between the grid and the surface of the cathode which is substantially independent of cathode internal resistance and contact potential.

16. In a color television receiver or the like including a source of a color difference signal which is blanked during the retrace interval, the combination of, a color difference signal amplifier including a vacuum tube having cathode and grid input electrodes and an output electrode, an alternating current coupling including a capacitor connecting the output of said source to said input electrodes, a kinescope including an electron gun having input electrodes, a direct current coupling from the output electrode of said amplifier to the input electrodes of said kinescope, a source of pulses of constant amplitude occurring during said retrace interval, and means coupling the output of said source of pulses to the input electrodes of said amplifier in a polarity and with an amplitude such as to draw grid current and establish a bias voltage between the grid and the surface of the cathode which is substantially independent of cathode internal resistance and contact potential.

References Cited in the file of this patent

UNITED STATES PATENTS

| | | |
|---|---|---|
| 2,681,379 | Schroeder | June 15, 1954 |
| 2,736,765 | Lohman | Feb. 28, 1956 |
| 2,798,900 | Bradley | July 9, 1957 |

OTHER REFERENCES

Practical Color Television, RCA, 1953, Circuit Diagram Fold 3.

Color TV, Rider Pub. March 1954, page 142.

Introduction to Color Television, Admiral Corp., Chicago, Ill., February 1954.